United States Patent Office 3,002,935
Patented Oct. 3, 1961

3,002,935
PREPARATION AND USE OF TABLETED CATALYSTS
Emory W. Pitzer, Bartlesville, Okla., assignor to Phillips Petroleum Company, a corporation of Delaware
No Drawing. Filed Aug. 11, 1958, Ser. No. 754,147
11 Claims. (Cl. 252—443)

This invention relates to a process for preparing and using tableted catalysts A specific aspect of the process pertains to the preparation of tableted catalysts which retain their original strength after heating.

Various catalysts are prepared in tablet form by preparing the catalyst constituent or constituents in powdered form as by grinding or otherwise comminuting, and the resulting powder is fed to a tableting machine, such as a Stokes tableting machine, to form the powdered material into compacted strong tablets The tablet press consists of a metal or carbide die into which punches fit with close precision to compress the catalyst powder after it is fed into the dies Extremely high pressures are required to bind the catalyst powder into a tablet and the strength of the tablet is directly proportional to the force applied in the tableting procedure After the tablet is formed, it is forced out of the die with one of the punches The tableting press is a precision-built machine and a small amount of wear on the dies and punches necessitates replacement of those parts These replacements are expensive and add appreciably to the cost of the catalyst tablets.

It has been found that when tableting various catalyst powders they must be compressed at pressures high enough to produce appreciably greater strength in the tablets than the desired final strength because the tablest lose strength when they are heated to reaction temperatures in the catalytic reaction zone in which they are utilized. In some instances this loss of strength is equivalent to 50 percent or more of the original strength. If this loss in strength can be reduced or completely eliminated, the tablets can be made at the desired final strength thereby avoiding excessive pressure and excessive wear on the tableting machine and reducing the ultimate cost of tableting.

It has also been found that tablets have been made at the required strength and after packing the same into a sizeable reactor space and utilizing the tablets at high temperature in a catalytic reaction, the tablets have broken down and gone to dust or powdered form, thereby necessitating removal of the crumbled catalyst from the reactor and replacing the same with strong catalyst tablets or pellets.

Accordingly, it is an object of the invention to provide an improved process for tableting powdered catalytic materials. Another object is to reduce the ultimate cost of preparing tableted catalysts. A further object is to provide a process for preparing tableted catalysts which retain substantially their initial crushing strength after heating. Another object is to provide a process for preparing tableted catalysts of powdered catalytic material and bringing the tablets to reaction temperature in a reaction zone while preserving substantially the original crushing strength of the tablets. It is also an object of the invention to provide a process for dehydrogenating butene to butadiene with a tableted potassium carbonate-iron oxide-chromium oxide containing catalyst while preserving the original crushing strength of the tablets. A still further object is to provide a process for dehydrogenating n-butane to butenes in contact with tableted alumina-chromium oxide catalyst while preserving the original crushing strength of the tablets. Other objects of the invention will become apparent from a consideration of the accompanying disclosure.

A broad aspect of the invention comprises heating powdered catalytic material to reduce the moisture content of the material to less than 0.5 wt. percent and, preferably, to less than 0.2 wt. percent, tableting the dried material while at this low moisture content in a dry ambient, and maintaining the resulting tablets at this low moisture content until heated to reaction temperature in a reaction zone. I have found that if the catalyst powder is not dried to this low moisture content at the time of tableting the tablets lose a substantial proportion of their crushing strength when heated to reaction temperature. I have also found that if the tablets absorb moisture after the tableting step, the crushing strength of the tablets is drastically cut when the moisture-containing tablets are heated to elevated temperatures.

The process of the invention is applicable to tableting of various types of powdered catalytic materials which absorb moisture from the air when exposed thereto for extended periods of time. All of the porous adsorptive materials from which catalysts are made such as active alumina, silica-alumina, and various mixtures of these materials with other catalytic materials absorb appreciable amounts of water from air and can be treated in accordance with the invention to provide improved catalyst tablets which do not lose crushing strength when heated to high temperatures. Other catalytic materials to which the invention is applicable include hygroscopic metal salts, such as potassium or sodium carbonate, magnesium carbonate, calcium chloride, etc. Any of the porous metal oxides also absorb moisture from the air and are amenable to processing in accordance with the invention. Magnesium oxide, molybdenum oxide, nickel oxide, chromium oxide, and other well-known catalytic metal oxides of a porous structure fall in this category.

If the catalytic raw materials to be tableted are not in powdered form, they are comminuted or ground to powder, preferably, to an average size of less than 25 microns and, in some cases, less than 5 or even 2 microns in diameter. In some instances it is desirable to agglomerate the fine particles, by conventional means, and then crush or otherwise comminute the aggregates to a mesh size of 40 to 325 mesh to facilitate flow of the material into the small dies. The powdered material is then calcined at temperatures in the range of about 500 to 1500° F. for a period of at least 15 to 20 hours so as to reduce the moisture content of the powder to less than 0.5 and preferably less than 0.2 wt. percent. The heating time is inversely proportional to the temperature so that when the higher temperatures in the range are utilized, the time may be reduced to as little as about 3 hours. The main consideration is to reduce the moisture content to the required level regardless of the temperature and time of heating.

After the powdered catalytic material is dried, it is usually essential to maintain the relative humidity of the ambient at less than about 5 percent as determined at 80° F. and, even after tableting, the tablets must not be exposed to air or other gaseous ambient of greater relative humidity than about 5 percent. It has been found that if the tablets or the powder absorb as much as one wt. percent of water they suffer a small but measurable drop in crushing strength when heated to elevated temperatures such as those utilized in catalytic hydrocarbon conversions, i.e., temperature upwards of 500° F. After the catalyst has been tableted, it is frequently calcined before packaging before shipping to the user. When this procedure is followed, the calcined tablets must be maintained at their low moisture content at all times prior to the heating of the catalyst in the reactor and raising to an elevated temperature, such as at least 500° F. and, preferably, 800 to 900° F. After the tablets are raised to a temperature of 800 to 900° F. they may be contacted with steam at this or higher temperature without deteriorating the tablet strength; however, if the tablets are contacted in cold condition with hot steam their strength is greatly reduced as is the case if the hot tablets are contacted with low temperature steam for any substantial period.

The process of the invention is particularly effective with butene dehydrogenation catalysts containing about 52.2% $K_2CO_3$–44.6% $Fe_2O_3$–3.2% $Cr_2O_3$ (percent by weight). Of course, the amounts of the constituents may be varied over a substantial range and the catalytic activity will remain substantially the same and the same crushing strength will be obtained. The constituents of the catalyst were ground together to a small particle size to form a fine powder and the powder was calcined at a temperature of 1000° F. for 15 hours to reduce the moisture content to a level below about 0.2 wt. percent. The dry powder was cooled in an ambient atmosphere of less than 5% relative humidity and was tableted in a Stokes tableting machine without exposing the catalytic material to an ambient of greater relative humidity than 5%. The tablets thus prepared were calcined at 1000° F. for a period of more than 3 hours. The crushing strength of the tablets thus prepared as measured by a standard crushing strength test was compared with the crushing strength of tablets made from the same catalyst powder with the exception that the second prepared tablets were prepared from the powder after long exposure to atmospheric air and the powder was not dried before tableting. Other conditions were the same for the preparation of the two batches of tablets. The data obtained are set forth in the table below.

Table

| Catalyst Powder Not Dried Before Tableting | | | Catalyst Powder Dried Before Tableting | | |
|---|---|---|---|---|---|
| Before Calcination | After Calcination | Change | Before Calcination | After Calcination | Change |
| 5.1 | 1.3 | −3.8 | 5.1 | 5.5 | +0.4 |
| 7.1 | 3.7 | −3.4 | 6.5 | 7.0 | +0.5 |
| 10.9 | 3.8 | −7.1 | 9.0 | 9.0 | 0.0 |

The strength variation before calcination was produced by varying the pressure applied to the powder in the dies. Corresponding pressures were applied to the moist and dry powders in the pelleting step. The foregoing data clearly demonstrate the effectiveness of the invention in maintaining original tablet strength after subjecting the tablets to an elevated temperature such as 1000° F.

Tablets prepared in accordance with the invention, having the composition illustrated in the above data and treated in accordance with the invention so as to avoid allowing the moisture content to rise above 0.5 wt. percent at any time prior to the raising of the tablet temperature to about 900°, were packed into a butene dehydrogenation reactor directly from sealed drums containing dry gas after purging the reactor with dry gas at elevated temperature. The ordinary replacement time of a catalyst bed in the butene dehydrogenation reactors is from ½ to a full working day of 8 hours but the reactor in this instance was completely repacked with the dry tablets in a period of about 45 minutes in order to prevent absorption of moisture by the tablets during handling. During the charging operation, the reactor was continuously purged with dried air. As soon as the reactor was packed with the dry tablets a stream of sweet dry gas containing light hydrocarbons (principally methane) and hydrogen was passed thru the reactor at an elevated temperature sufficient to raise the temperature of the bed of tablets to about 1100°. At this time a stream of superheated steam at a temperature above 1100° F. was passed thru the reactor at the proper rate for the dehydrogenation step and in admixture with the sweet gas. Thereafter butenes were substituted for the sweet gas to provide a ratio of steam to hydrocarbon of about 12 to 1. This placed the catalyst bed on stream in the normal process of dehydrogenating butenes to butadiene. The catalyst bed was utilized on stream for an extended period without substantial depreciation of the strength of the catalyst tablets.

My copending application S.N. 640,920, filed February 18, 1957, now U.S. Patent 2,866,790, discloses the iron oxide-chromium oxide-potassium carbonate catalyst referred to above.

A tableted commercial catalyst consisting essentially of 60 wt. percent alumina and 40 wt. percent chromium oxide was heated at 1500° F. in air for 12 to 15 hours. It was found that the crushing strength of the heated tablets dropped from the range of 8 to 10 pounds to an average of slightly less than 3 pounds.

A laboratory prepared catalyst of the same composition was prepared by merely tableting a mixture of the powdered constituents after being exposed to ordinary room atmosphere for several days. The tablets thus prepared were heated in the same manner as the foregoing commercial catalyst and tested for crushing strength. It was found that these tablets exhibited very similar performance to the commercial catalyst, as to crushing strength.

A batch of the same powder, from which the foregoing laboratory prepared catalyst was made, was dried to a low moisture content by heating before tableting and the tableting was performed in a dry room. The resulting tablets were fired at 1500° F. without allowing them to absorb appreciable moisture and their crushing strengths were compared with their original crushing strengths. It was found that they retained all of their original crushing strength.

Certain modifications of the invention will become apparent to those skilled in the art and the illustrative details disclosed are not to be construed as imposing unnecessary limitations on the invention.

I claim:

1. A process for preparing for use at an elevated temperature, strong catalyst tablets from powdered catalytic material which absorbs moisture when exposed to atmospheric air, which comprises heating said material at an elevated temperature of at least 500° F. but below the deactivation temperature of said catalytic material so as to reduce the moisture content to below about 0.5 wt. percent; tableting said material while at said moisture content; calcining the resulting tablets at an elevated temperature; and thereafter preventing sorption of moisture by the calcined tablets until same are contacted with a process stream of reactant gas catalyzed by said tablets at a temperature above 500° F., by maintaining said tablets in an ambient gas of less than 5 percent relative humidity as determined at 80° F., thereby maintaining the moisture content of said material below 0.5 weight percent at all times between the first and last heating steps whereby the original crushing strength of said tablets is maintained.

2. The process of claim 1 wherein said material is tableted in an ambient of low relative humidity below about 5% determined at 80° F.

3. The process of claim 1 wherein said catalytic material comprises porous active alumina.

4. The process of claim 1 wherein said catalytic material comprises porous silica-alumina.

5. The process of claim 1 wherein said catalytic material comprises a hygroscopic metal salt.

6. The process of claim 1 wherein said catalytic material comprises a mixture of potassium carbonate, iron oxide, and chromium oxide.

7. The process of claim 1 wherein said catalytic material comprises a mixture of porous active alumina and chromium oxide.

8. The process of claim 1 wherein said tablets are maintained at said moisture content until packed into a reactor and heated to reaction temperature above 800° F.

9. A process for preparing strong catalyst tablets from powdered moisture-absorbent material and bringing the tablets to an elevated reaction temperature while maintaining the crushing strength of the originally formed tablets, which comprises drying said material at elevated temperature to a moisture content below about 0.2 wt. percent; tableting the dried material in a dry ambient while at said moisture content; maintaining said tablets at said moisture content by maintaining said tablets in an ambient gas of less than 5 percent relative humidity as determined at 80° F.; purging the reaction space in a reactor with a dry gas; packing said tablets while at said moisture content into said reaction space; and contacting the packed tablets with hot dry gas to raise same to a reaction temperature of at least 500° F. while maintaining said moisture content, thereby avoiding sorption of moisture on said material from the first heating step thru the last heating step and maintaining the original crushing strength of said tablets.

10. The process of claim 9 wherein said catalytic material comprises potassium carbonate, iron oxide, and chromium oxide.

11. The process of claim 9 wherein said catalytic material comprises porous active alumina and chromium oxide.

References Cited in the file of this patent

UNITED STATES PATENTS

| | | |
|---|---|---|
| 2,315,107 | Chickenoff et al. | Mar. 30, 1943 |
| 2,461,147 | Davies et al. | Feb. 8, 1949 |
| 2,509,869 | Kirshenbaum | May 30, 1950 |
| 2,664,451 | Owen | Dec. 29, 1953 |
| 2,687,987 | Bennett | Aug. 31, 1954 |
| 2,735,801 | Gutzeit | Feb. 21, 1956 |
| 2,754,345 | Kirshenbaum | July 10, 1956 |
| 2,787,522 | Lefrancois | Apr. 2, 1957 |
| 2,790,015 | Hindin | Apr. 23, 1957 |
| 2,817,626 | Mabry et al. | Dec. 24, 1957 |